Feb. 14, 1928.
J. NELSON
1,659,495
LINING UP REAMER FOR CONNECTING RODS
Filed March 3, 1925
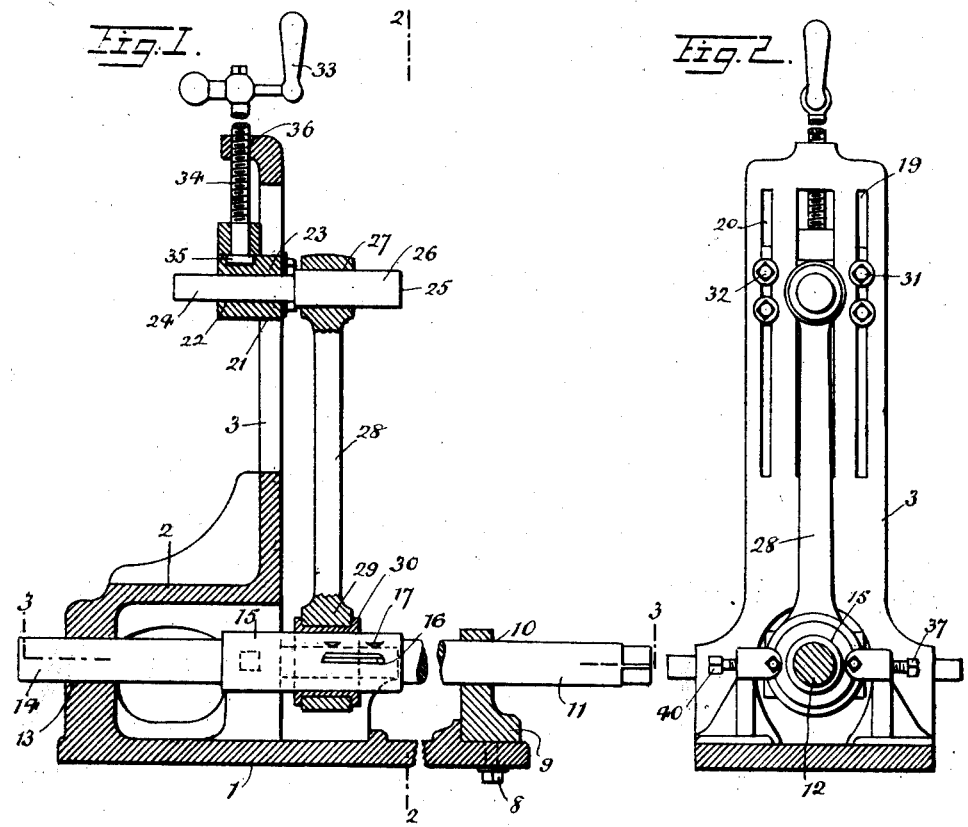
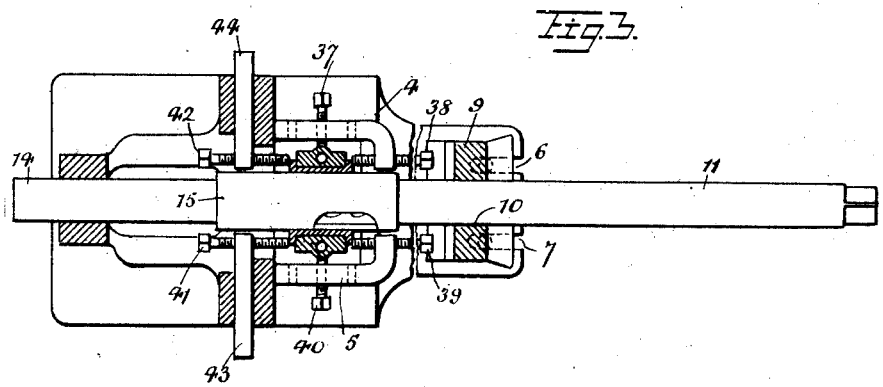
WITNESSES
H. T. Walker
A. L. Kitchin
INVENTOR
John Nelson
BY Munn & Co
ATTORNEYS Patented Feb. 14, 1928.

1,659,495

UNITED STATES PATENT OFFICE.

JOHN NELSON, OF NEW YORK, N. Y.

LINING-UP REAMER FOR CONNECTING RODS.

Application filed March 3, 1925. Serial No. 12,970.

This invention relates to a reaming device and has for an object to provide a reaming device which will not only ream but which will line up the bearings of a connecting rod of an internal combustion engine so that it will be restored to its original condition.

Another object in view is to provide a lining up reamer which may be manually operated and which will line up the two bearings of a connecting rod and ream the lining of the head of the connecting rod without twisting the same.

A further object, more specifically, is to provide a lining up reamer for connecting rods wherein a plurality of set screws are positioned so as to engage and hold the connecting rod rigidly in a given position while the reamer is performing its work.

In the accompanying drawing—

Figure 1 is a longitudinal vertical sectional view through a lining up reamer, disclosing one embodiment of the invention.

Figure 2 is a sectional view through Figure 1, approximately on line 2—2.

Figure 3 is a sectional view through Figure 1, approximately on line 3—3.

Referring to the accompanying drawing by numerals, 1 indicates the base plate which is preferably cast integral with a housing 2 and an upstanding standard 3 as well as with screw carrying walls or abutments 4 and 5. The base 1 is provided with a pair of slots 6 and 7 accommodating the respective clamping bolts 8 which extend through these slots upwardly into a bracket 9 having a bore 10 for accommodating the end section 11 of a reamer 12. Whenever desired, the bolts 8 could be loosened and the bracket 9 slid longitudinally of section 11 until it was removed therefrom whereby reamer 12 could be removed from the device.

It will be noted from Figures 1 and 3 that the housing 2 is provided with a bore 13 in exact alignment with bore 10, said bore 13 accommodating the section 14 of the reamer 12. The reamer 12 may be of any suitable kind and is preferably formed with an enlarged body 15 carrying adjustable knives or reaming members 16 which are clamped in any desired adjusted position by suitable screws 17. The reamer 12 may be actuated by any suitable means, as for instance, by a hand operated crank fitted onto the square end of section 11. The standard 3 is provided with a large vertical slot 18 and two small vertical slots 19 and 20. The slot 18 accommodates the extension 21 of a bearing block 22 provided with a bore 23 for accommodating the small section 24 of pin 25, which pin has a large section 26 adapted to snugly fit into the bore 27 of the connecting rod 28. The head 29 of the connecting rod 28 is provided with a bushing 30 as usual into which the reamer 12 is forced and which is cut to the proper size by the knife 16. Preferably the knife is adjusted so as to make the preliminary cut and then several other additional cuts after the knife has been adjusted to increase the bore of the bushing 30. In this way the bushing is properly sized and if the head 29 is held properly in position, the bore of the bushing will be accurate or exactly parallel with the bore 27. In regard to the extension 21, the same slides up and down in slot 18 and is held in position by reason of the fact that various bolts 31 and 32 are provided which extend through the slots 19 and 20 into block 22 whereby the block is locked in any adjusted position. When a longer or shorter connecting rod 28 is to be reamed, bolts 31 and 32 are loosened and the crank 33 rotated for rotating the screw 34, which screw is provided with an enlarged head 35 embedded in the block 22 but allowed to freely rotate therein. The screw 34 extends through a threaded opening in the turned over end 36 of standard 3 whereby when the crank 33 is rotated block 22 will be raised or lowered according to the direction of rotation. After the block 22 has been properly located, bolts 31 and 32 are tightened until the block 22 is positively locked against movement. The head 29 of the connecting rod 28 is then placed in substantially the position shown in Figure 1 and pin 25 inserted into the correct position as shown in Figure 1. The reamer 12 is then applied and forced into the bushing 30 for a short distance whereby the bushing is properly centered but knife 16 has not yet begun to function. After the bushing has been properly centered, the various set screws 37, 38, 39, 40, 41 and 42 are moved to a correct position for rigidly clamping the bushing 30 and head 29 in their correct positions. After the parts have thus been rigidly clamped against shifting or twisting, the reamer 12 is caused to function and may take one cut on the bushing 30 or may take several cuts as may be desired. In this cutting operation, the parts would spring slightly to one side if the set screws 37 and 42 were not used to lock the parts against twisting or springing. The locking of the parts in this manner prevents any twisting and thereby causes the reamed liner 30 to have a bore exactly parallel to the bore 27 whereby when the crank shaft is again placed in the engine it will function in its most efficient manner.

After the reaming operation has been completed, the screws 8 are loosened and the bracket 9 is moved off of base 1 and in fact, off of the section 11 of the reamer. The reamer is then manually grasped and pulled out of the bore 13 as well as out of the bushing 30. The set screws 37 and 42 are then loosened and finally pin 25 is removed whereupon the connecting rod may be lifted out of the machine. The members 4 and 5 are preferably integral with the base 1 and properly support the various set screws 37 to 40 inclusive. However, the set screws 41 and 42 are mounted in slidable bars 43 and 44 which are slid into the proper position and then the set screws 41 and 42 tightened.

What I claim is:

In a lining up reamer for connecting rods of engines, means for supporting the connecting rod so that the large end will be rigidly held against movement during a reaming operation, said means including a set screw on each side of said end operating radially in respect to the bore of said end, a plurality of set screws on each side of said end and operating longitudinally in respect to said bore and acting to clamp said end against movement longitudinally in respect to the bore, and a pair of sliding supports for supporting the screws at one side of said end.

JOHN NELSON.